United States Patent
Dombrowski et al.

(10) Patent No.: US 6,275,167 B1
(45) Date of Patent: Aug. 14, 2001

(54) METHOD AND SYSTEM FOR COMMUNICATING BETWEEN REMOTE-CONTROLLED MODULES IN AUTOMOTIVE VEHICLES

(75) Inventors: John Edward Dombrowski, Ypsilanti; Richard Alan Kraus, Farmington Hills, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/092,744

(22) Filed: Jun. 8, 1998

(51) Int. Cl.$^7$ .................................................. H04M 11/04
(52) U.S. Cl. .................... 340/825.57; 370/419; 370/229
(58) Field of Search ...................... 340/825.57, 825.63, 340/310.06, 310.02, 310.01, 870.39; 370/419, 229; 375/239; 307/10.1

(56) References Cited

U.S. PATENT DOCUMENTS

| | | |
|---|---|---|
| 4,459,591 | 7/1984 | Haubner et al. . |
| 4,639,609 | 1/1987 | Floyd et al. . |
| 4,715,031 | 12/1987 | Crawford et al. . |
| 4,739,323 * | 4/1988 | Miesterfeld et al. ............. 340/825.5 |
| 4,926,158 * | 5/1990 | Zeigler .............................. 340/310 A |
| 5,274,636 | 12/1993 | Halter et al. . |
| 5,363,405 | 11/1994 | Hormel . |
| 5,418,526 | 5/1995 | Crawford . |
| 5,418,720 | 5/1995 | Randel . |
| 5,495,469 | 2/1996 | Halter et al. . |
| 5,579,299 | 11/1996 | Halter et al. . |
| 5,600,634 | 2/1997 | Satoh et al. . |
| 5,621,250 * | 4/1997 | Kim ...................................... 307/10.1 |

FOREIGN PATENT DOCUMENTS

| | | |
|---|---|---|
| 196 37 312 A1 | 3/1998 | (DE) . |
| 0 406 718 A2 | 1/1991 | (EP) . |

\* cited by examiner

Primary Examiner—Michael Horabik
Assistant Examiner—M. Shimizu
(74) Attorney, Agent, or Firm—Mark L. Mollon

(57) ABSTRACT

A method and system for transferring pulse messages between remote-controlled modules in an automotive vehicle includes a single wire bus coupled to each of the modules for transferring the pulse messages between each of the modules. A receiver circuit associated with at least one of the modules and coupled to the bus provides a communication current to the bus. A transmitter circuit associated with at least one of the modules and also coupled to the bus transmits the pulse messages utilizing the communication current. The receiver circuit, thus, becomes active and accepts the pulse messages being transmitted by the transmitter circuit upon detecting the communication current being drawn from the receiver circuit.

10 Claims, 10 Drawing Sheets

ON Message #10

OFF Message #10

METHOD AND SYSTEM FOR COMMUNICATING BETWEEN REMOTE-CONTROLLED MODULES IN AUTOMOTIVE VEHICLES

TECHNICAL FIELD

This invention relates to methods and systems for communicating between remote-controlled modules in automotive vehicles.

BACKGROUND ART

The current state of automotive electronics is maturing rapidly. Designers and manufacturers are driven by a market which constantly demands more functionality, both as a result of the increasing tastes of users and by demands of competition. In particular, automotive electronics has grown quite rapidly as new features are added and old features are upgraded to place them under electronic control. Consequently, complexity of the vehicle interior subsystems in general and wiring in particular is adversely affected. Multiplexing is a choice for designers wishing to both reduce wiring complexity and increase functionality.

As a result, the field of multiplexing is becoming a sophisticated endeavor with many competing systems all trying for attention. At the low end of the multiplexing spectrum there exists those applications which traditionally would not have been contenders for electronic multiplexing. However, advances in electronics have changed that with single wire multiplexing now becoming feasible.

U.S. Pat. No. 4,459,591 issued to Haubner et al. discloses a method and system for communicating between remote-controlled modules utilizing a single communication line, such as a light guide. Pulse sequences having different pulse widths, pulse gap widths and number of pulses are arranged in a predetermined order to form codes for receipt by respective control modules. Although this system utilizes light pulses as the communication medium in order to minimize sensitivity to electrical noise and voltage offsets, such a system is relatively expensive and difficult to integrate into the vehicle assembly process.

DISCLOSURE OF THE INVENTION

It is thus a general object of the present invention to provide an inexpensive, yet reliable method and system for communicating between remote-controlled modules in automotive vehicles that is insensitive to voltage offsets as well as vehicle electrical noise.

In carrying out the above object and other objects, features, and advantages of the present invention, a method is provided for transferring pulse messages between remote-controlled modules in an automotive vehicle having a single wire bus coupled to each of the modules for transferring the pulse messages between each of the modules, at least one of the modules including a receiver circuit for receiving the pulse messages and at least one of the modules including a transmitter circuit for transmitting the pulse messages. The method includes providing a communication current to the bus. The method also includes transmitting the pulse messages utilizing the communication current. Still further, the method includes receiving the pulse messages transmitted by the transmitter circuit upon detecting the communication current being drawn from the receiver circuit.

In further carrying out the above object and other objects, features, and advantages of the present invention, a system is also provided for carrying out the steps of the above described method. The system includes a single wire bus coupled to each of the modules for transferring the pulse messages between each of the modules. The system also includes a receiver circuit associated with at least one of the modules and coupled to the bus for providing a communication current to the bus. Still further, the system includes a transmitter circuit associated with at least one of the modules and coupled to the bus for transmitting the pulse messages utilizing the communication current. The first receiver circuit becomes active and accepts the pulse messages transmitted by the transmitter circuit upon detecting the communication current being drawn from the receiver circuit.

The above object and other objects, features and advantages of the present invention are readily apparent from the following detailed description of the best mode for carrying out the invention when taken in connection with the accompanying drawings.

BRIEF DESCRIPTION OF THE DRAWINGS

FIG. 7 is a detailed schematic diagram of the collision detector circuit shown in FIG. 4a;

BEST MODES FOR CARRYING OUT THE INVENTION

Figure 1:
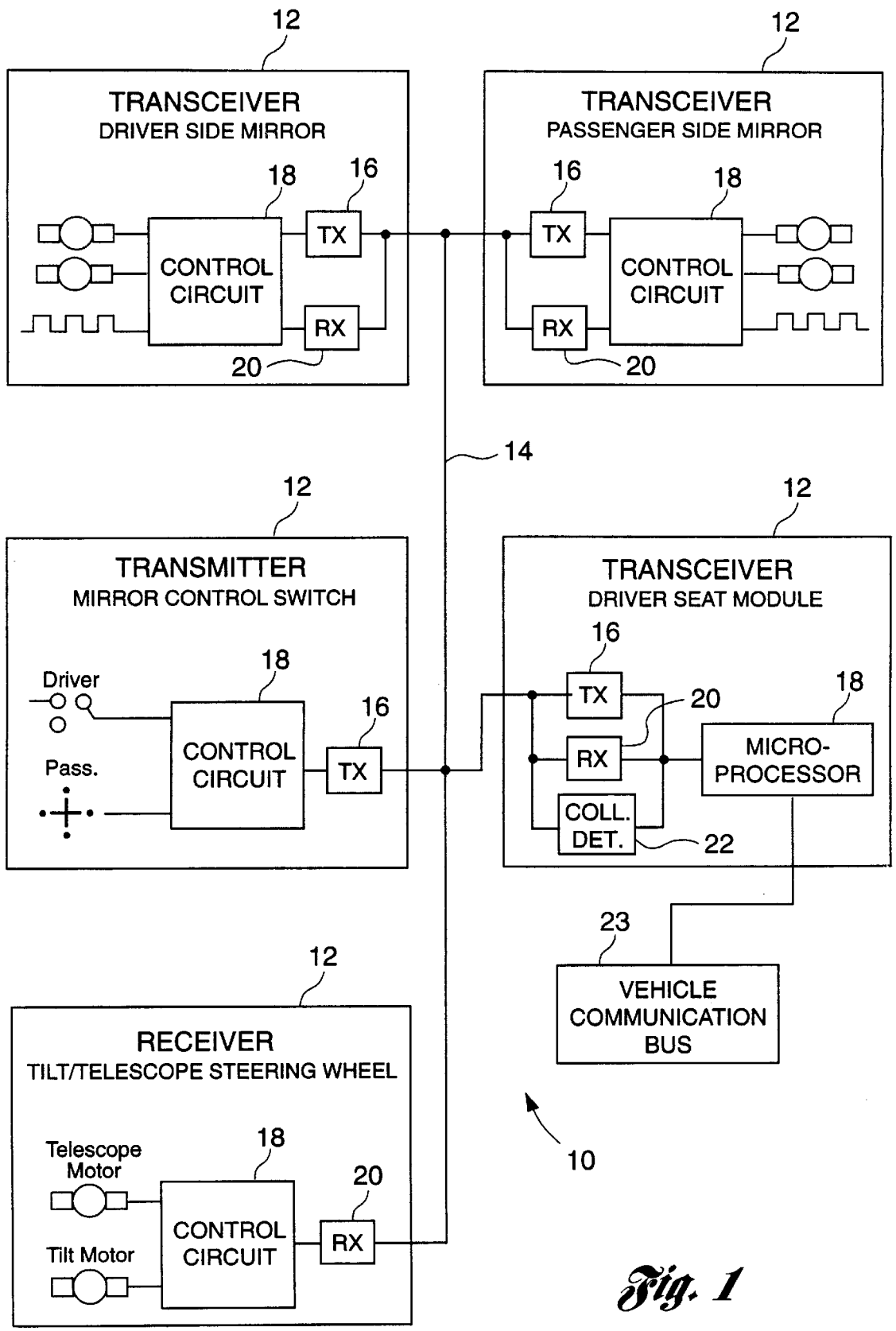
FIG. 1 is a schematic block diagram of a remote-control system in accordance with the invention.

Turning now to FIG. 1, there is shown a schematic block of the remote-control system of the present invention, denoted generally by reference numeral 10. The system 10 includes a plurality of modules 12 that need to communicate with each other utilizing a limited set of commands. The system 10 utilizes a communication scheme wherein messages are sent to each of the modules 12 as pulses of current drawn from a communication bus 14 consisting of a single wire interface that is normally pulled high to battery voltage, e.g., 12.0 VDC, and having a predetermined impedance, e.g., 200 ohms. The modules 12 may include complex devices such as smart mirrors, window motors, mirror control switches, and climate control actuators, which are powered from a vehicle's battery (not shown), as well as low power data nodes such as steering wheel switch multiplexers and sensors that may be powered from the bus 14 directly.

The system 10 further includes at least one transmitter circuit 16 associated with at least one of the modules 12 for transmitting the pulses of current. Transmission of the pulses is controlled by a control circuit 18 associated with each of the modules 12. The control circuit 18 can be embodied by an electronically-programmable microprocessor, a microcontroller, an application-specific integrated circuit, or a like device to provide the required control. For example, a depression of a mirror control switch by a user of the vehicle causes control circuit 18 to initiate the transmitter circuit 16 to transmit a corresponding communication pulse.

The pulses are received by receiver circuits 20 associated with at least one of the modules 12. The receiver circuit 20 detects the communication pulse and forwards the pulse to the control circuit 18 for processing. For example, the control circuit 18 may then direct a motor to turn ON or OFF. Each of the modules 12 may consist of a transmitter circuit 16, a receiver circuit 20, or both a transmitter circuit 16 and a receiver circuit 20, as shown in FIG. 1.

Furthermore, any of the modules 12 may also have a collision detector circuit 22 associated therewith. The communication scheme is designed so that only one module 12 transmits a pulse at a time. Therefore, collision detector circuit 22 detects multiple transmitters communicating simultaneously. This feature is not necessary to the invention, but may be desirable for certain modules in which communication is critical.

Figure 2A:
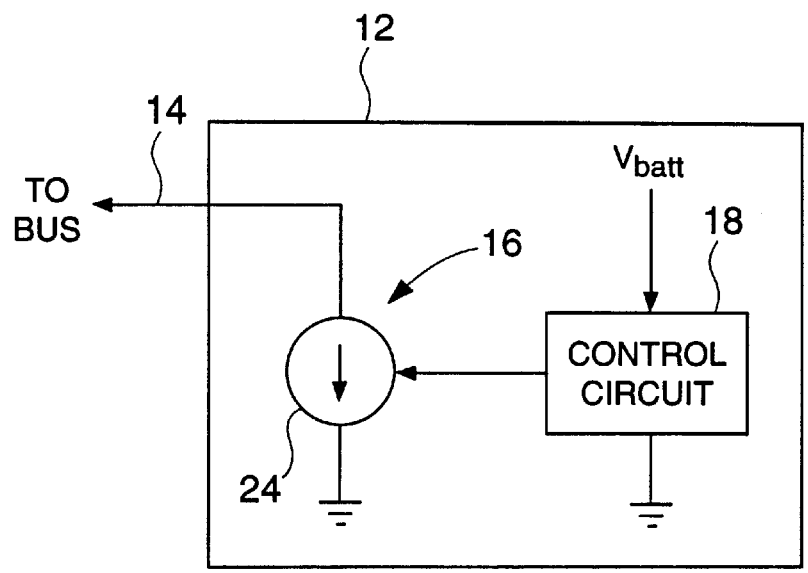
FIGS. 2a–2b are simplified schematic diagrams of alternative transmitter circuits in accordance with the system of the present invention.
Figure 2B:
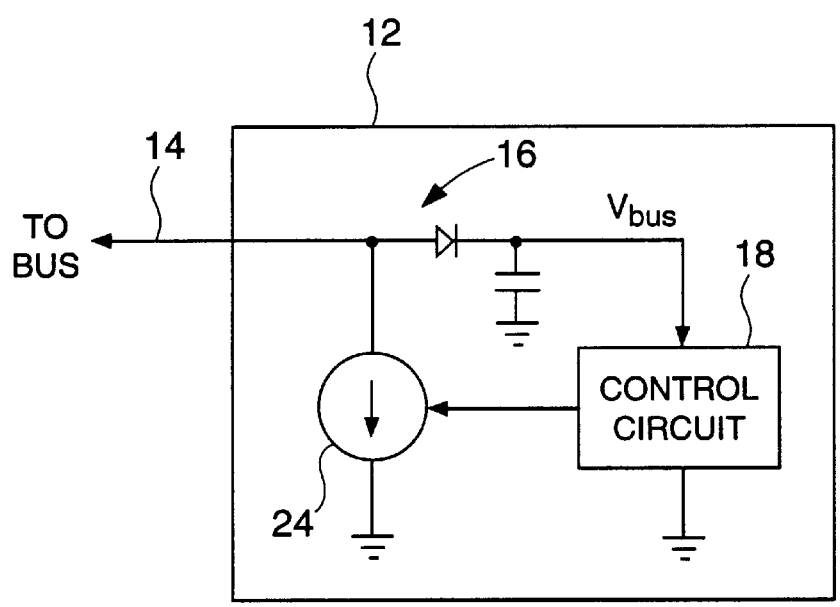

Turning now to FIGS. 2a–2b, there are shown simplified circuit diagrams of alternative transmitter circuits 16. As stated above, the transmitter circuit 16 draws current from the bus 14 to communicate with the other modules 12. Thus, the transmitter circuit 16 consists of an active low pull down constant current driver 24 that is current limited to a predetermined amount of current, e.g., 20 mA. The transmitter circuit 16 shown in FIG. 2a is powered from the vehicle's battery (not shown), Vbatt, while the transmitter circuit 16 shown in FIG. 2b is powered from the bus 14.

It is possible to have modules 12 that draw their power directly from the bus 14 if they quiescently draw less current than the thresholds required for communication. This feature is useful for reducing the wiring from a remote module 12 to a single wire, i.e., the bus 14, since the module 12 is both powered from the bus 14 and communicates over it.

In either case, when the transmitter circuit 16 draws its current from the bus 14, the bus voltage drops from its quiescent level, i.e., 12.0 VDC. The amount of the voltage drop is determined according to the following: Vdrop= Icom×Rbus, where Icom is the predetermined communication current, i.e., 20 mA, and Rbus is the impedance of the bus 14, i.e., 200 ohms, resulting in Vdrop=4.0 VDC. So, the bus voltage, which equals 12.0 V under quiescent conditions, drops by 4.0 VDC when communication occurs, resulting in a bus voltage of 8.0 VDC.

Figure 3A:
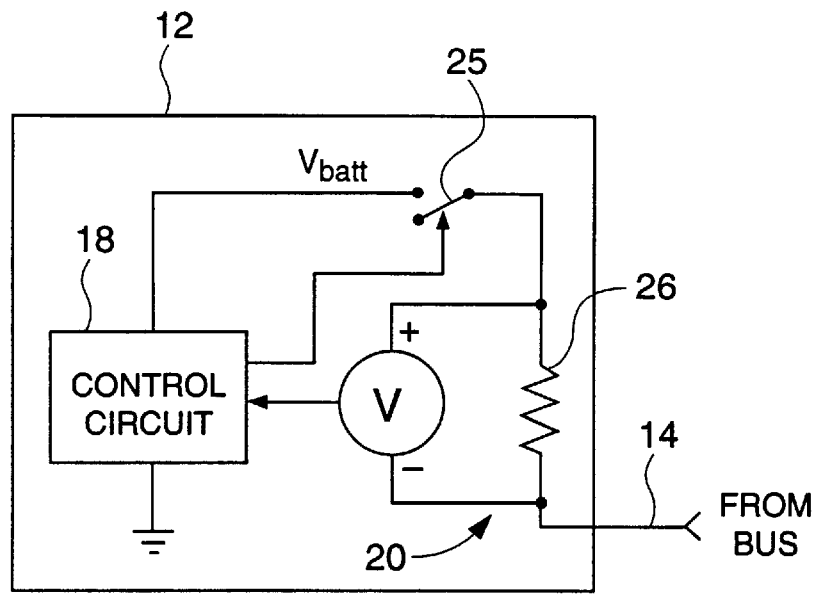
FIGS. 3a–3b are simplified schematic diagrams of alternative receiver circuits in accordance with the system of the present invention.
Figure 3B:
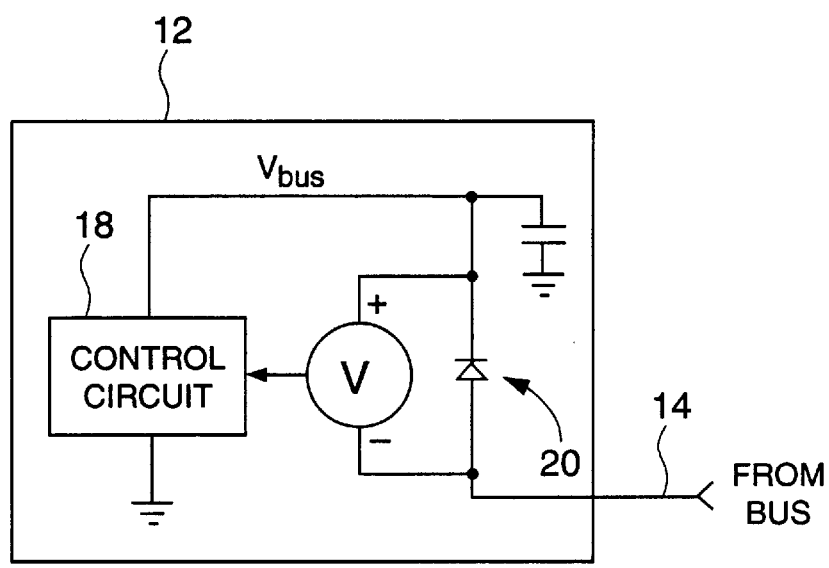

Turning now to FIGS. 3a–3b, there are shown simplified schematic diagrams of alternative receiver circuits 20. The receiver circuit 20 shown in FIG. 3a is powered from the vehicle's battery. These receiver circuits 20 provide pull-up resistors 26 for the bus 14 so that current drawn from the pull-up resistors 26 can be detected when communication occurs. When multiple modules 12 provide pull-up resistors, the resistance is distributed to each module 12 so that the total bus impedance is 200 ohms to Vbatt. The receiver circuits 20 detect a data pulse when 15 mA or more is being drawn from the bus 14. A 5 mA of hystersys is provided in the receiver circuit 20 so that the output of the receiver circuit 20 shall remain active until the current drawn from the bus drops below 10 mA.

The receiver circuit 20 shown in FIG. 3b, on the other hand, is powered from the bus 14. These receiver circuits 20 monitor the bus voltages associated with communication. Since the bus 14 is designed so that there is a 4.0 VDC drop from the quiescent state when a 20 mA communication pulse occurs, the receiver circuits 20 become active when the bus voltage drops 3.0 VDC or more from the quiescent state voltage and remains active until the bus voltage rise to a drop of 2.0 V or less from the quiescent state voltage.

Figure 4A:
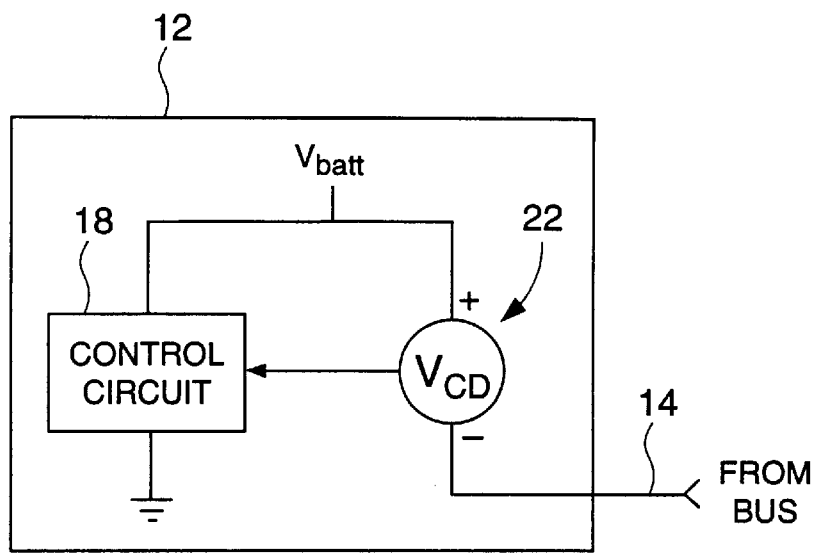
FIGS. 4a–4b are simplified schematic diagrams of alternative collision detector circuits in accordance with the system of the present invention.
Figure 4B:
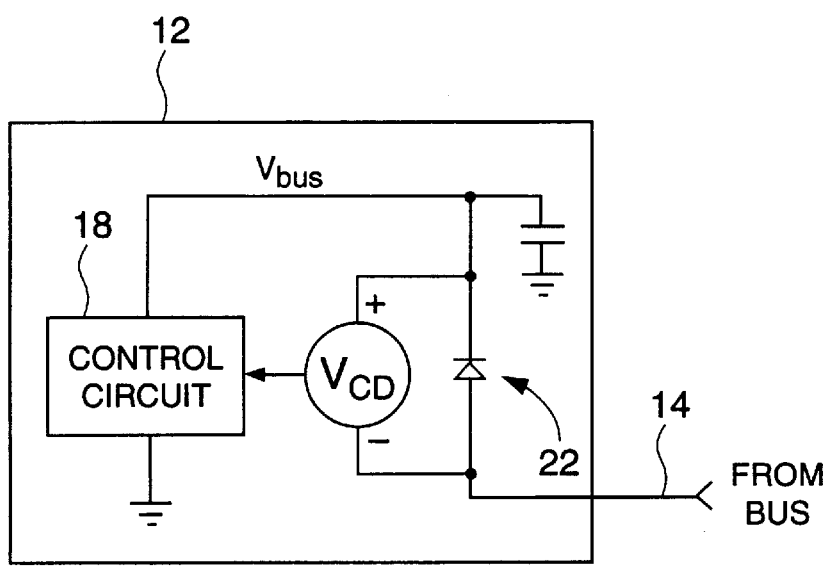

Turning now to FIGS. 4a–4b, there are shown simplified schematic diagrams of alternative collision detector circuits 22. Since the total bus impedance is 200 ohms and the bus voltage drops when a transmitter circuit 16 communicates, then the bus voltage drops even more when two transmitter circuits 16 communicate simultaneously, thus colliding. The collision detector circuit 22 detects this excessive voltage drop. The design of the collision detector circuit 22 is similar to that of the receiver circuit 20, except that the collision detector circuit 22 responds to larger voltage thresholds and do not provide current onto the bus. As with the transmitter and receiver circuits 18, 20, the collision detector circuit 22 may be powered by Vbatt, FIG. 4a, or from the bus 14, FIG. 4b.

Figure 5A:
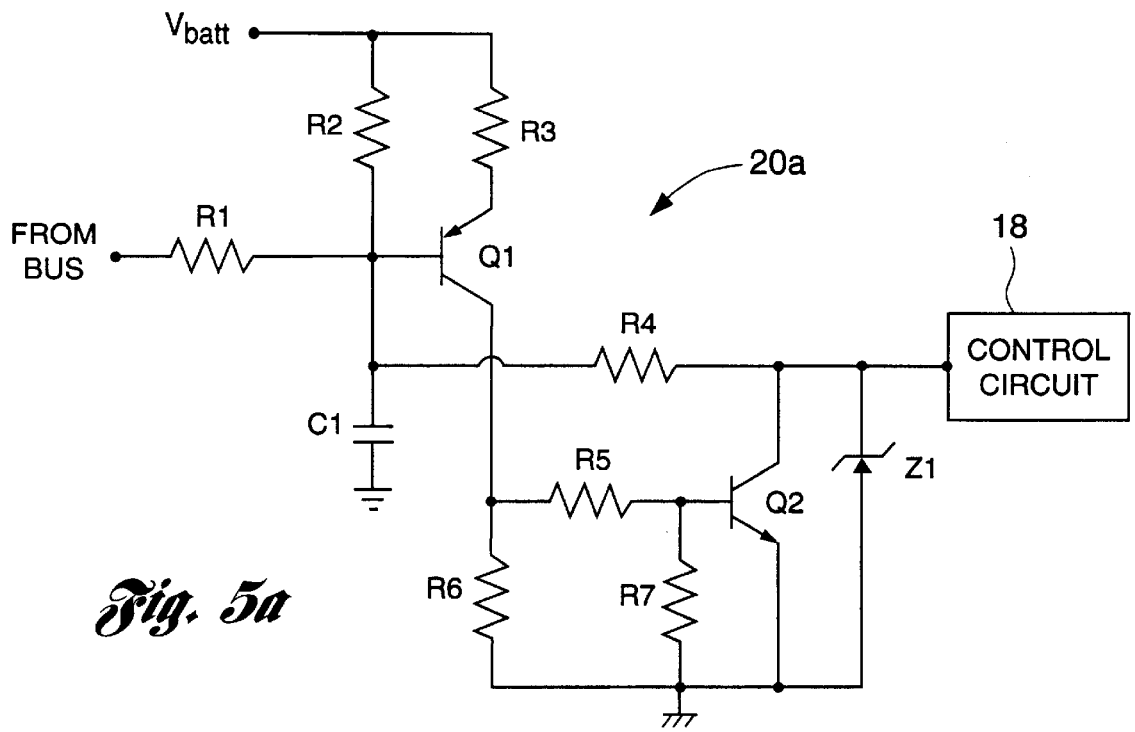
FIGS. 5a–5b are detailed schematic diagrams of the receiver circuits shown in FIGS. 3a–3b.

Operation of the Vbatt-powered receiver circuit 20a will now be discussed in greater detail in conjunction with the schematic diagram illustrated in FIG. 5a. The receiver circuit 20a is designed such that under normal quiescent conditions, the bus 14 is pulled up to the battery voltage by resistors R1 and R2. Since communication occurs when a transmitter communicates on the bus 14 by drawing 20 mA of current from the bus 14, the 20 mA bus current is distributed among all of the transmitter circuits 16 that are powered by the battery. Thus, if a single receiver circuit is used, its circuit values for resistors R1, R2, R3 and R4 are sized appropriately to provide the full 20 mA bus communication current. If multiple receiver circuits 20a are used that are capable of providing current to the bus, however, then the value of resistors R1, R2, R3 and R4 are sized so that each receiver circuit 20a provides an equal portion of the communication current. Furthermore, the bus impedance is set by the parallel bus impedance of all receiver circuits 20a capable of providing current to the bus so that the bus voltage drops by 4.0 VDC from its quiescent level when a transmitter circuit 18 communicates with a 20 mA current pulse.

As discussed above, the receiver circuits 20a become active when 15 mA (or more) is being drawn from the bus 14 and have 5 mA of hystersys, so once they are active, they will remain active until 10 mA (or less) is drawn. This provides plenty of margin for them to detect the 20 mA communication current pulse and also provides noise immunity to the receiver circuit 20a when near its switching threshold.

The ratio of resistors R1 and R2 is also determined such that transistor Q1 begins to conduct when a threshold current of 15 mA is being drawn from the bus 14. Normally the collector of transistor Q1 is held near ground by resistor R6. Once transistor Q1 begins to conduct, the collector of transistor Q1 is raised to the battery potential. Raising the collector voltage of transistor Q1 provides bias to the base of transistor Q2 through the resistor divider created by resistors R5 and R7 to turn on transistor Q2. Once transistor Q2 is turned on, it draws additional current from the base of transistor Q1 through resistor R4 to create the 5 mA of hystersys.

Capacitor C1 limits the response of the receiver circuit 20 to signals that have an edge transition rate of greater than 100 µs. Zener diode Z1 limits the output voltage of the detected signal to a range acceptable by the control circuit 18. Finally, resistor R3 limits the amount of current than can pass through the base of transistor Q1 and onto the communication bus 14.

Figure 5B:
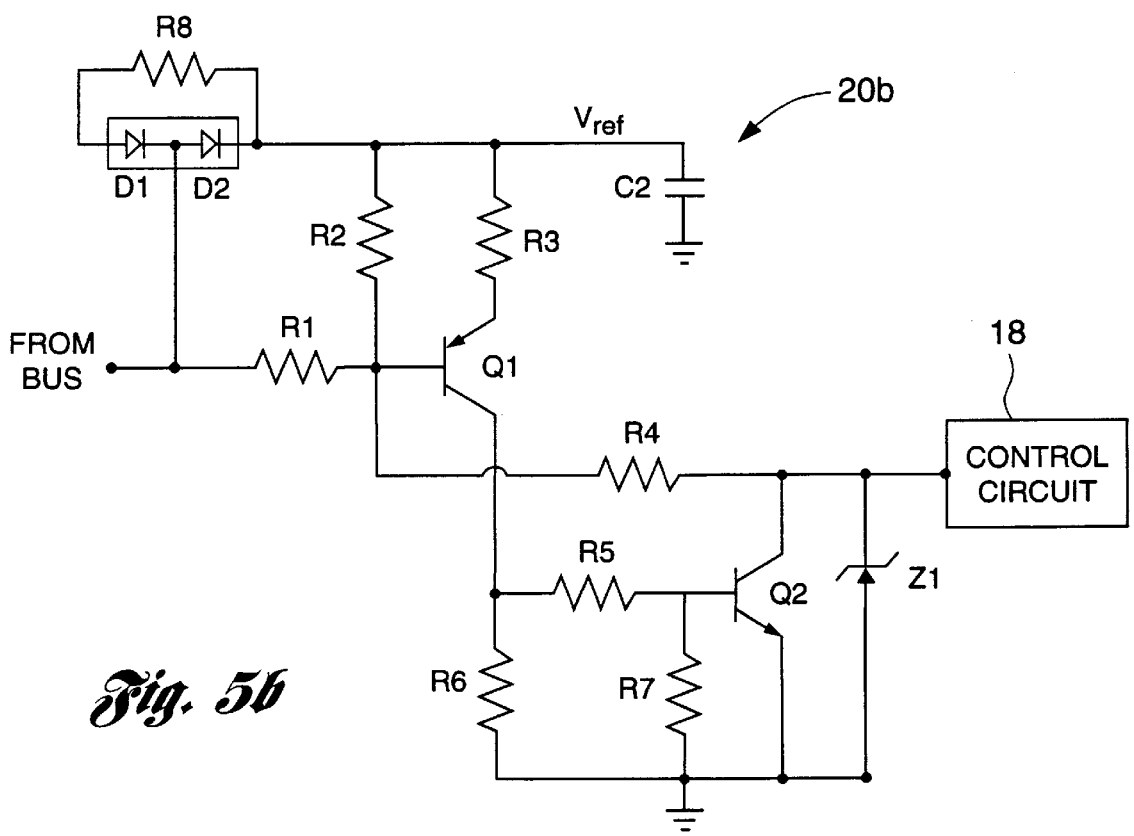

Turning now to FIG. 5b, a detailed schematic diagram is provided for the bus-powered receiver circuit 20b of FIG. 3b. This receiver circuit 20b operates in principle nearly identical to that of receiver circuit 20a, except that the series value of resistors R1 and R2 along with the values of resistors R3 and R4 are large enough so that the impedance of the circuit 20b has negligible effect on the bus loading and the circuit 20b derives its reference voltage from the bus 14 itself rather than from the vehicle's battery. The bus 14 can withstand up to 5 mA of this type of parasitic loading without detrimental performance.

The voltage reference is created by passing the power to operate the receiver circuit 20b from the bus 14 through diode D2, where it is stored in capacitor C2. As stated above, the bus 14 is held at the vehicle's battery voltage under quiescent conditions, however, in a real vehicle application the vehicle's battery voltage varies up and down by several volts depending on engine speed and electrical system loading. Thus, the reference created for this circuit 20b must track the battery voltage as it varies. This tracking is accomplished by the steering diodes D1 and D2. When the battery voltage rises, capacitor C1 is quickly charged through diode D2. But when the voltage falls, capacitor C1 is discharged slowly through resistor R8 and diode D1. Resistor R8 controls the rate of discharge, which must be carefully timed so that one communication pulse is not confused with a changing battery voltage.

Since the values of resistors R1, R2, R3 and R4 are large, the receiver circuit 20b neither contributes nor consumes a significant amount of current from the bus. It is then sensitive only to a change in the bus voltage from its quiescent level. The quiescent voltage level is stored in capacitor C2. The rest of the circuit 20b compares the instantaneous bus voltage to the voltage stored in capacitor C2.

Figure 6A:
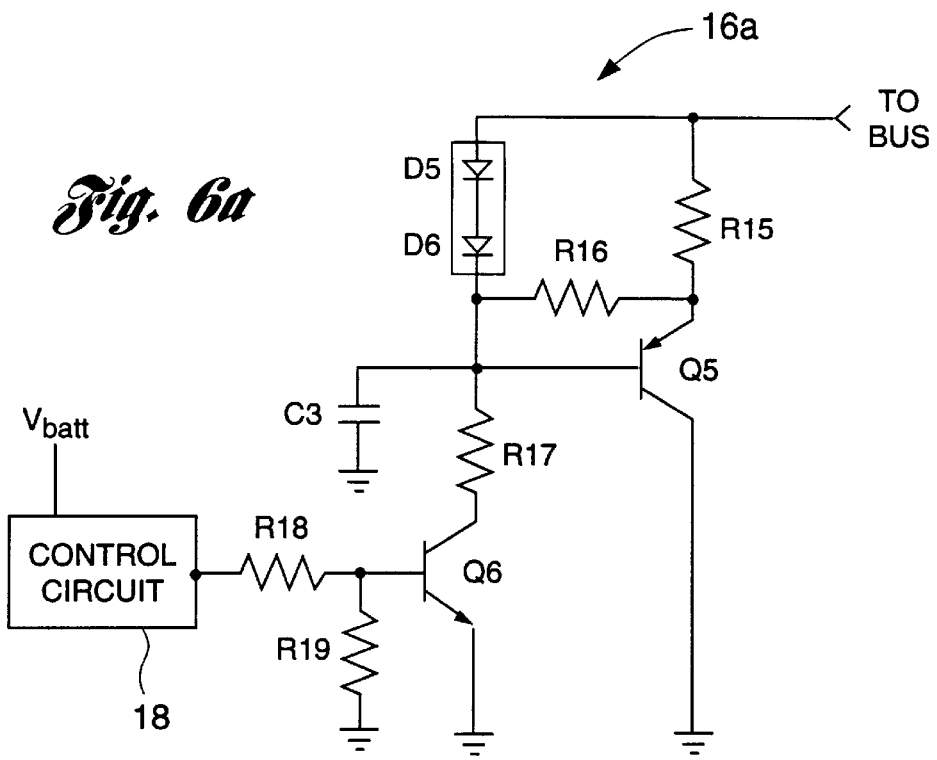
FIGS. 6a–6d are detailed schematic diagrams of the transmitter circuits shown in FIGS. 2a–2b.

With reference now to FIG. 6a, a detailed schematic diagram of the transmitter circuit 16a shown in FIG. 2a is illustrated. Transmitter circuit 16a is configured as a current regulator that draws a constant amount of current when activated by control circuit 18. The control circuit 18 activates the transmitter circuit 16a by applying a control voltage onto the resistor divider R18 and R19, which in turn activate transistor Q6. When transistor Q6 turns on, it draws base current from transistor Q5 through resistor R17, which in turn causes transistor Q5 to become active. Transistor Q5 begins to draw current from the bus 14 through resistor R15. The current being drawn from the bus 14 induces a voltage drop across resistor R15.

When the voltage across resistor R15 is equal to the turn-on threshold voltage of diodes D5 and D6, then some of the base drive current that was passing through the base of transistor Q5 is bypassed through diodes D5 and D6 instead. Limiting the base drive of transistor Q5 in turn limits the amount of current transistor Q5 can draw from the bus 14 through its collector. By sizing resistor R15 such that the voltage drop it creates at the desired bus current matches the threshold voltage of diodes D5 and D6, the transmitter circuit 16a regulates the current drawn from the bus to the desired bus current. Capacitor C3 and resistor R16 control the rate at which transistor Q5 may turn on or off. This limits the slew rate of the communication pulse edges so that the electromagnetic compatibility (EMC) emissions from the transmitter circuit 16a may be minimized.

Figure 6B:
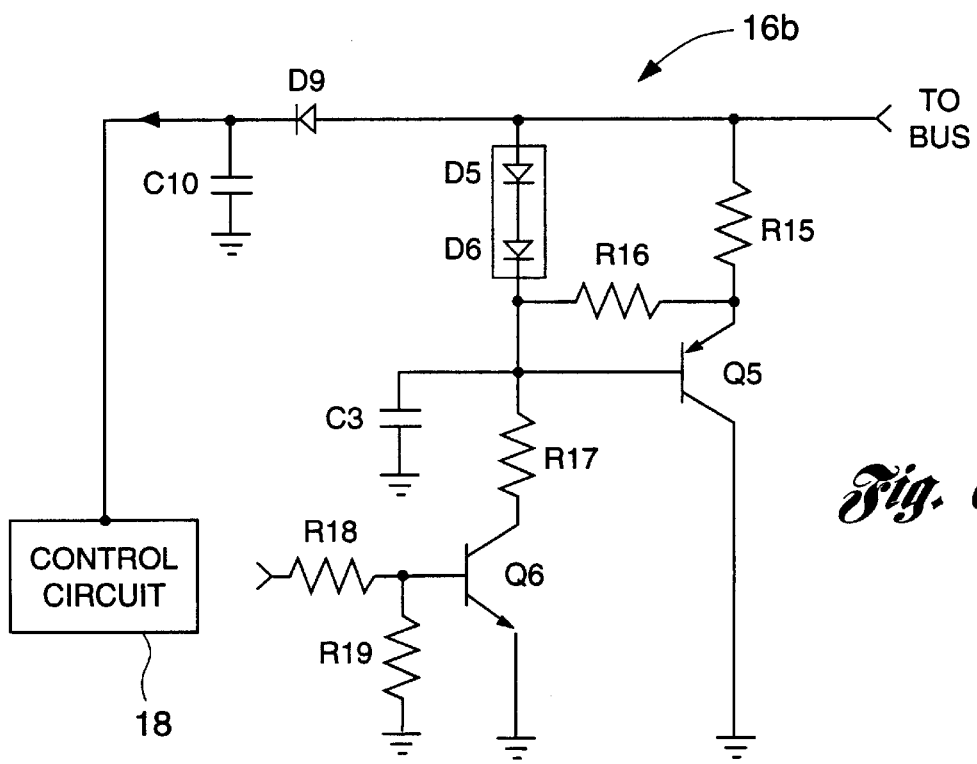

The operation of the bus-powered transmitter circuit 16b shown in FIG. 2b operates in the same manner as the transmitter circuit 16a shown in FIG. 6a, except for the addition of diode D9 and capacitor C10, as shown in the schematic diagram of FIG. 6b. Diode D9 and capacitor C10 siphon off and filter power from the bus 14 in order to operate the control circuit 18.

Figure 6C:
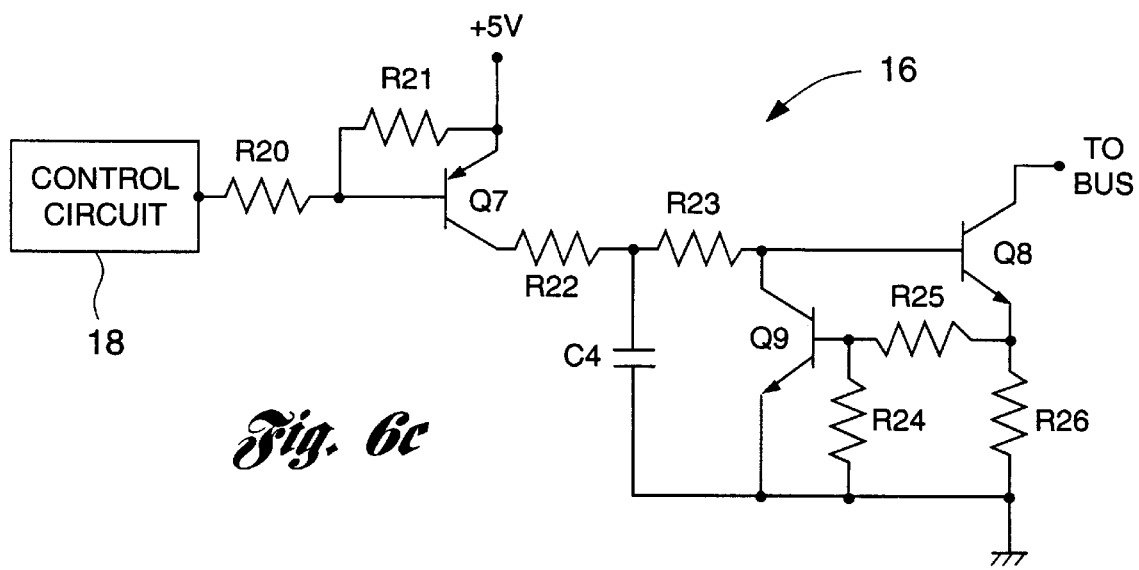
Figure 6D:
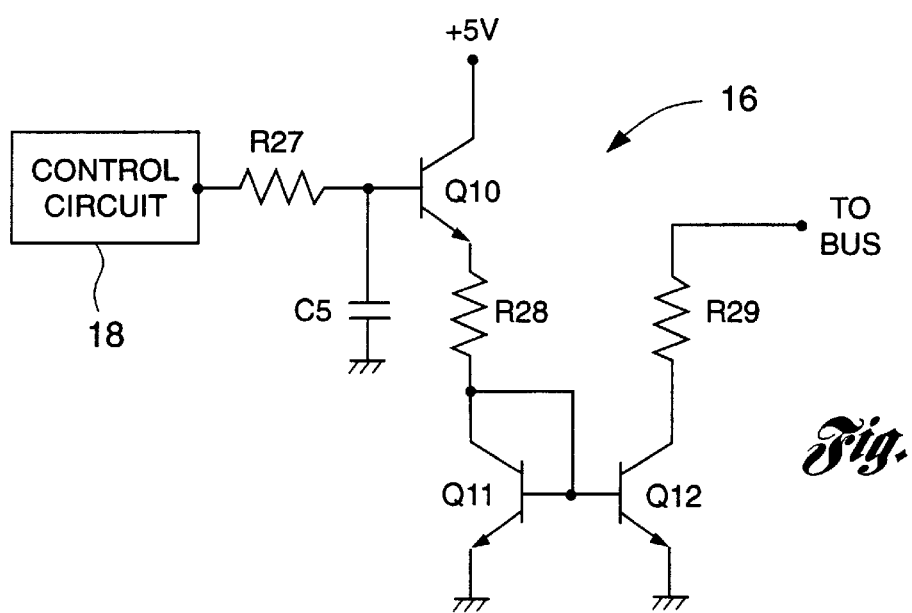

Turning now to FIGS. 6c–6d, there are shown schematic diagrams of alternative transmitter circuits 16 for creating a constant current regulator. As shown in FIG. 6c, the drive transistor Q8 draws current from the bus 14 through its collector and out its emitter. The current coming out of the emitter of transistor Q8 passes through resistor 26 to create a voltage across it. If voltage across resistor R26 (created by the bus current through it) exceeds the turn on threshold of transistor Q9 as set by the resistor divider formed by resistors R25 and R24, transistor Q9 will begin to turn on and consume some of the base drive current of transistor Q8. This will in turn limit the collector current through transistor Q8 until it regulates at a fixed amount. The control current for transistor Q8 is derived from the collector of transistor Q7. Transistor Q7 and resistors R21 and R20 form a simple inverter stage for the signal of the control circuit 18. Resistors R22, R23 and capacitor C4 limit the transition rate of transistor Q8 greater than 100 µs.

The transmitter circuit 16 shown in FIG. 6d is based on the classical current mirror circuit, which is formed by transistors Q11, Q12 and resistor R28. The current through transistor Q11 is set by the current allowed to pass through resistor R28. Since the base of transistors Q11 and Q12 are tied together, the current allowed to pass through transistor Q12 will exactly match (or mirror) the current allowed to pass through transistor Q11. By setting resistor R28 such that 20 mA can pass through transistor Q11, transistor Q12 will in turn draw 20 mA from the bus 14. Transistor Q10 allows the control circuit 18 to control the current mirror, while resistor R27 and capacitor C5 control the rate at which transistor Q10 turns on so that an edge transition rate of greater than 100 µs can be achieved on the bus 14.

Figure 7:
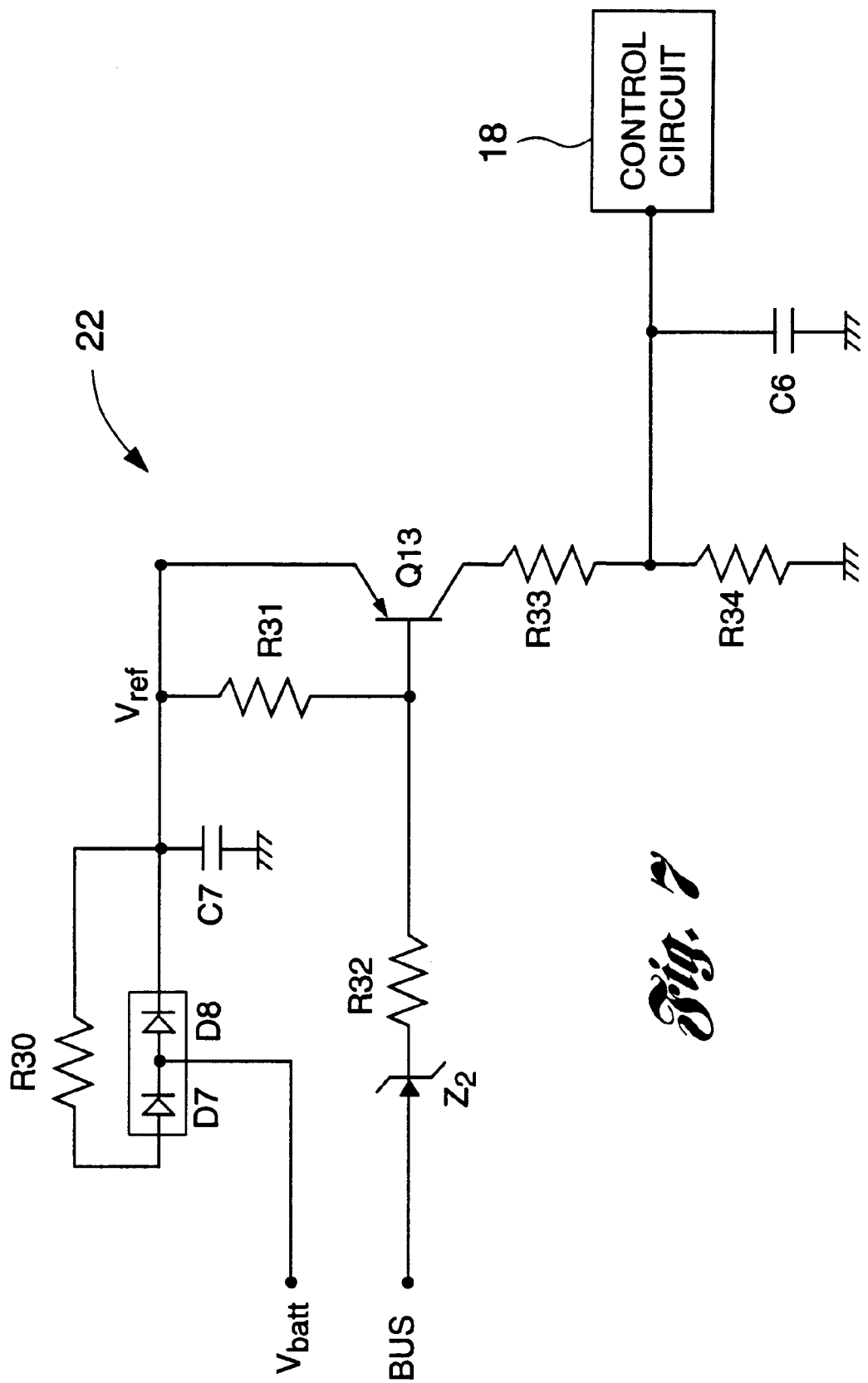

Turning now to FIG. 7, there is shown a detailed schematic diagram of the collision detector circuit 22 shown in FIG. 4a. As discussed above, the collision detector circuit 22 is very similar to the receiver circuit 20, except that the collision detector circuit 22 respond only to an excessive voltage drop and do not have any hystersys to affect their switching thresholds. In general, the collision detector circuit 22 has a high impedance so as not to affect bus loading. Steering diodes D7 and D8 along with resistor R30 and capacitor C7 create a voltage reference that the bus voltage will be compared against. As with the receiver circuit 20b, the voltage reference is designed to track the vehicle's varying battery voltage. The voltage reference may be derived from the vehicle battery or from the bus 14.

Zener diode Z2, along with resistor divider formed by resistors R31 and R32, set the threshold voltage that the collision detector circuit 22 is sensitive to. The zener diode Z2 prevents any loading on the bus 14 until the bus voltage has exceeded the reference voltage by more than 4.0 VDC. Beyond a bus voltage drop of 4.0 VDC, some small amount of current is allowed to be drawn through resistors R31 and R32 and zener diode Z2.

When the voltage drop on the bus 14 exceeds 6.0 VDC, sufficient current is drawn through resistors R31 and R32 and zener diode Z1 to allow transistor Q13 to switch on.

Normally, the collector of transistor Q13 is pulled to ground by resistors R33 and R34. When transistor Q13 switches on, its collector is pulled up t the reference voltage. Resistors R33 and R34 form a voltage divider that delivers a collision detected signal to control circuit 18. Capacitor C6 limits the response of the collision detector circuit 22 to signals that have an edge transition rate of greater than 100 μs.

As previously stated, the present invention utilizes a communication scheme in which messages are sent as pulses of current drawn from the bus 14. The length of each of the pulses form the coded messages. All communication on the bus 14 is preferably in periods or states that are increments of 500 μs. The current pulses have controlled rising and falling edges, preferably 100 μs from 10–90%. This slow transition rate minimizes the generation and receipt of electrical noise.

Transmission begins with the transmitter circuit 16 waiting for the bus 14 to be quiet for a minimum of 2 state periods (2×500 μs). The transmitter circuit 16 then sends one of a predefined message for receipt by each of the receiver circuits 20. The chart below is exemplary of a preferred message structure:

| Message # | ON MESSAGE | OFF MESSAGE |
|---|---|---|
| 1 | L. Mirror Stop | R. Mirror Stop |
| 2 | L. Mirror Up | R. Mirror Up |
| 3 | L. Mirror Down | R. Mirror Down |
| 4 | L. Mirror Left | R. Mirror Left |
| 5 | L. Mirror Right | R. Mirror Right |
| 6 | Recall Memory 1 | Store Memory 1 |
| 7 | Recall Memory 2 | Store Memory 2 |
| 8 | Recall Memory 3 | Store Memory 3 |
| 9 | Puddle lamp ON | Puddle lamp OFF |
| 10 | Mirror Heater ON | Mirror Heater OFF |
| 11 | Mirror Fold | Mirror Unfold |
| 12 | Reverse Mode ON | Reverse Mode OFF |
| 13 | L. Mirror Selftest, OR L. Mirror Selftest Passed | L. Mirror Selftest Failed |
| 14 | R. Mirror Selftest, OR R. Mirror Selftest Passed | R. Mirror Selftest Failed |
| 15 | Invalid | Invalid |

Figure 8:
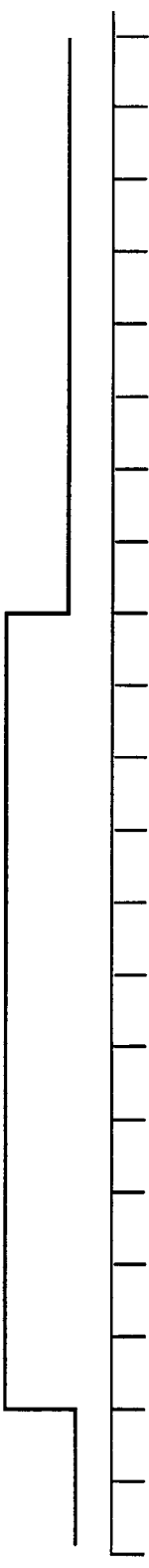
FIG. 8 is a graph illustrating the format of an ON message utilized in accordance with the present invention.
Figure 9:
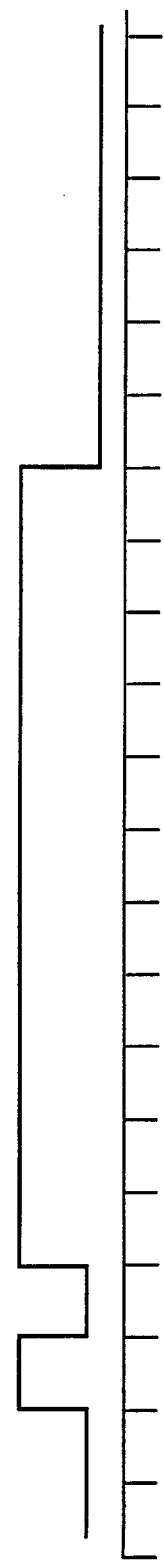
FIG. 9 is a graph illustrating the format of an OFF message utilized in accordance with the present invention.

As illustrated above, the pulse message may be either an ON message or an OFF message. An ON message is defined as a 20 mA current pulse being placed onto the bus for the number of periods that corresponds to the message number plus 1. Therefore, in order for message number 10 to be ON, a pulse width of (10+1)*500 μs or 5.5 ms is transmitted by the transmitter circuit 16, as illustrated in FIG. 8. Note that messages 13 and 14 includes two different ON messages. In this case, the first message is a request by a module 12 requesting a selftest, wherein the second message is the response sent by the receiving module. OFF messages are similar to ON messages, but consist of a single period flag which precede the message pulse. An OFF message consists of the bus being active for 1 bus period, inactive for 1 period, then active for the message number plus 1 bus periods. FIG. 9 illustrates an OFF message for message number 10.

Any pulses that are generated on the bus 14 that extend past the maximum allowable message number are ignored. In addition, all modules 12 are predefined with a priority number which defines how long the module 12 should wait before attempting to retransmit its message in case of a collision. The priority number of the module indicates the number of bus states the module must wait (plus the 2 bus states it normally must wait) for the bus to be quiet before it can attempt to retransmit its message. Low priority numbers are assigned to the highest priority modules, therefore, modules with lower priority numbers will be allowed to transmit their message before modules with higher priority numbers since the lower priority numbers translate into a shorter pulse width than the higher priority numbers. Identifying each module 12 with a unique priority number insures that two modules 12 do not "sync up" with collisions that force retransmissions that again collide.

The transmitter circuits 16 are required to wait until the bus 14 has been quiet for two state periods before they attempt to send their transmissions. While they are sending a transmission, there is a possibility for a collision to occur. The transmitter circuits 16 monitor their own transmission for the possibility of collisions by verifying that the bus 14 returns to the quiescent state within one state period after they have finished their message. If the bus 14 does not return to the quiescent state, then a collision has occurred.

Figure 10A:
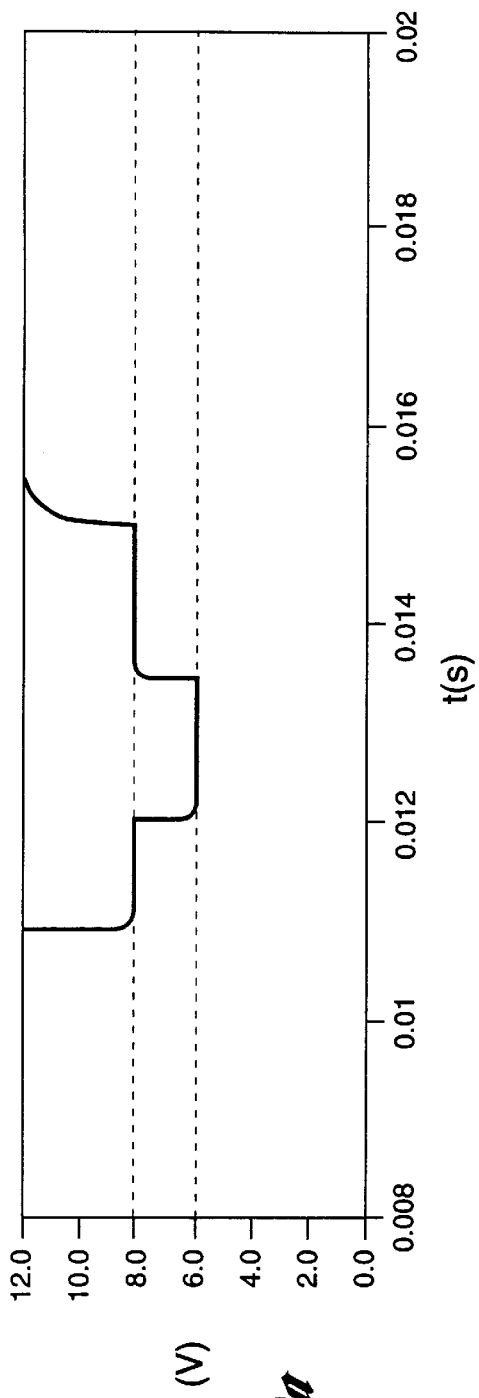
FIGS. 10a–10c are graphs illustrating the voltage drop across the bus when a collision occurs during a communication attempt.
Figure 10B:
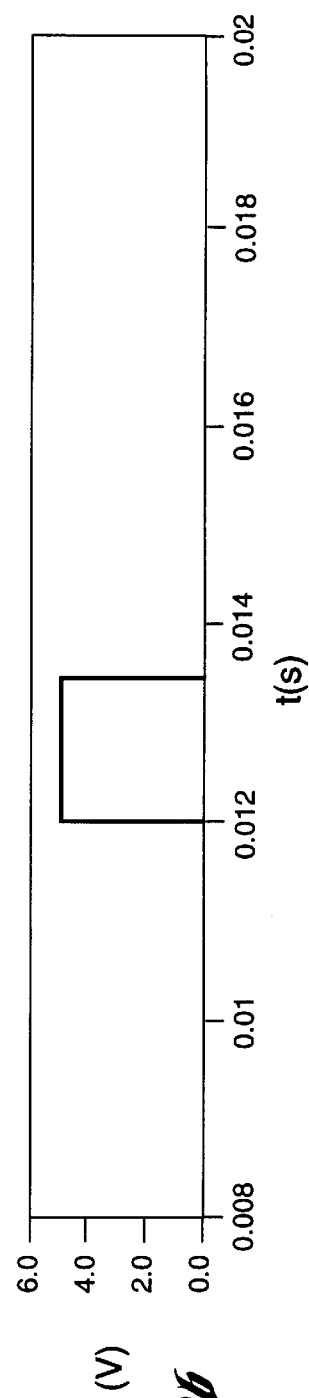
Figure 10C:
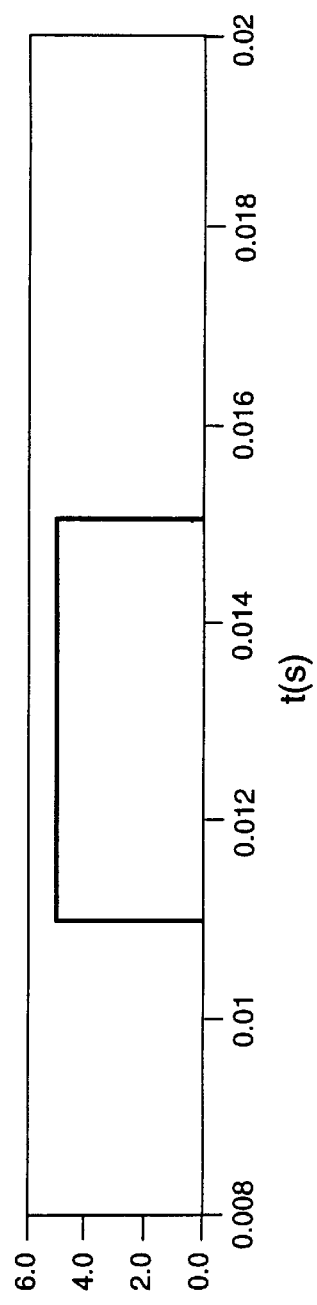

FIGS. 10a–10c illustrate the voltage drop of the bus 14 during a collision. As shown in Figure 10c, a transmitter circuit 16 of a first module 12 transmits a first message resulting in the voltage of the bus 14 dropping from 12.0 VDC to 8.0 VDC (i.e., the predetermined 4.0 VDC voltage drop), as shown in FIG. 10a. Since all of the transmitter circuits 16 consist of 20 mA current sources, two modules 12 will each be attempting to draw 20 mA from the bus 14 when a collision occurs. Thus, when a transmitter circuit 16 of a second module 12 attempts to transmit a second message during the transmission of the first message, FIG. 10b, the bus voltage drops to 6.0 VDC. This excessive voltage drop may be detected by the optional collision detector circuits 22.

Upon detecting the collision, each of the modules 12 shall instruct their respective transmitter circuits 16 to reactivate in order to stretch out the pulse beyond the maximum allowable length so that it will be ignored. After both modules 12 stretch out their messages, they both should release the bus 14 and wait until the bus 14 becomes inactive for two state periods. Each module 12 will then wait an additional delay based upon their priority and, if the bus 14 is available, the module 12 having the higher priority (i.e., lowest priority number) will attempt a retransmission.

The system 10 of the present invention optionally supports a low power sleep mode. At least one of the modules 12 somehow knows when the vehicle is turn on (and/or whether it needs to turn on). Either the key has been turned on and provides power to the module 12, the module 12 has an input that detects when it should turn on, or the module 12 receives a message over the vehicle's communication bus 23 (FIG. 1) instructing it to turn on. Thus, a module 12 that is powered from the battery at all times has some method of turning off unnecessary circuitry when the vehicle is shut off.

Once the module 12 has decided to turn off, the system 10 can be shut down in one of two ways. First, the low power sleep mode may be entered upon the receiver circuits 20 receiving a sleep command. Upon receiving the sleep command, the receiver circuits 20 incorporating pull-up resistors will then turn off their pull-up resistors 26. This action also deactivates any modules 12 that are powered from the network regardless of whether they received the sleep command. Any module 12 with a local wake-up may then wake up the entire network by re-energizing the network. Consequently, all the other modules 12 would then recognize the rising bus voltage and wake up.

The second low power sleep mode is achieved by de-powering the bus 14. Any module that has the ability to go into a low power sleep mode also has the ability to remove power from any unnecessary circuitry, such as the bus 14. This is accomplished utilizing a transistor switch 25 (FIG. 3a) located between the power source, i.e., battery, and the circuit to be powered down, i.e., receiver 20. Since the receiver circuits 20 provide the power to the bus 14 (through their pull-up resistors), de-powering the bus 14 will actually look like an unusually long message to the remaining modules 12 on the bus 14. If the message length exceeds the maximum allowable message length, and the receiver output has not risen to the inactive state, then the remaining modules 12 enter a low power sleep mode. To exit the sleep mode, any module 12 providing a network pull-up resistor 26 can re-apply power to the bus 14. The other modules 12 will detect this by the output of the receiver circuits 20 again rising to the inactive state and complete their wake up sequence. This method, however, is suitable only when one module 12 on the bus 14 has a receiver circuit 20 that can provide communication current to the bus 14.

Thus, the advantages of the present invention are numerous. First, the present invention allows for the flexible development of a multi-node peer-to-peer bi-directional communication with collision detection, a simple unidirectional communication between master nodes and slave nodes, or a point-to-point communication between an electronic module and a remote sensor. Second, the use of the constant current sources as the transmitting medium in the present invention allows the network to operate in harsh automotive environments where the supply voltage can vary widely and the modules may be at different potentials. The use of constant current sources as transmitters also allows the detection of collisions due to multiple transmitters talking on the bus simultaneously and drawing excessive current from the bus. Third, due to the inherently slow data rate, and the ability to control signal slew rates, electrical noise generated by the network is also minimized.

While the best modes for carrying out the invention have been described in detail, those familiar with the art to which this invention relates will recognize various alternative designs and embodiments for practicing the invention as defined by the following claims.

What is claimed is:

1. A method for transferring pulse messages between remote-controlled modules in an automotive vehicle having a single wire bus coupled to each of the modules for transferring the pulse messages between each of the modules, at least two of the modules including a receiver circuit for receiving the pulse messages and at least one of the modules including a transmitter circuit for transmitting the pulse messages, the method comprising:

providing an impedance associated with each receiver circuit sufficient to pull the bus up to a voltage source by an equal amount to obtain a bus voltage, and a communication current on the bus from the voltage source;

transmitting the pulse messages utilizing the communication current, wherein the pulse causes the bus voltage to decrease by a first predetermined voltage drop; and receiving the pulse messages upon detecting the communication current being drawn from the receiver circuits.

2. The method as recited in claim 1 further comprising a third receiver circuit associated with at least one of the modules and coupled to the bus for receiving power from the bus, wherein receiving the pulse messages includes detecting the first predetermined voltage drop from the voltage source.

3. The method as recited in claim 2 wherein the pulse messages have a rising edge rate and a falling edge rate and a fundamental frequency associated with each of the rising and falling edge rates, and wherein transmitting the pulse messages includes limiting the rising and falling edge rates long enough so that the fundamental frequency is small enough to minimize generation of electrical noise.

4. The method as recited in claim 1 further comprising detecting more than one pulse message being transmitted at the same time indicating a collision has occurred during communication.

5. The method as recited in claim 1 wherein the automotive vehicle has an active state and an inactive state and wherein at least one of the modules includes means for identifying when the at least one module should be turned off when the automotive vehicle transitions into the inactive state and the method further comprising turning off the bus so as to relieve current drain from the voltage source when the at least one module turns off.

6. The method as recited in claim 5 wherein turning off the bus includes transmitting a sleep mode pulse message.

7. The method as recited in claim 5 wherein each receiver circuit includes a switch coupled between the voltage source and the receiver circuit and wherein turning off the bus includes controlling the switch to remove the voltage source for the bus.

8. A method for transferring pulse messages between remote-controlled modules in an automotive vehicle having a single wire bus coupled to each of the modules for transferring the pulse messages between each of the modules, at least one of the modules including a receiver circuit for receiving the pulse messages and at least one of the modules including a transmitter circuit for transmitting the pulse messages, the method comprising:

providing a communication current to the bus by providing an impedance associated with the receiver circuit sufficient to pull the bus up to a voltage source to obtain a bus voltage and provide the communication current to the bus from the voltage source;

transmitting the pulse messages utilizing the communication current, wherein the pulse causes the bus voltage to decrease by a first predetermined voltage drop;

receiving the pulse messages upon detecting the communication current being drawn from the receiver circuit; and detecting a second predetermined voltage drop of the bus voltage to indicate a collision has occurred during communication from more than one pulse message being transmitted at the same time, wherein the second predetermined voltage drop is larger than the first predetermined voltage drop.

9. A system for transferring pulse messages between remote-controlled modules in an automotive vehicle, the system comprising:

a single wire bus coupled to each of the modules for transferring the pulse messages between each of the modules;

a first receiver circuit associated with at least one of the modules and coupled to the bus for providing a portion of a communication current to the bus;

a second receiver circuit associated with at least one of the modules and coupled to the bus for providing a portion of the communication current to the bus;

a transmitter circuit associated with at least one of the modules and coupled to the bus for transmitting the pulse messages utilizing the communication current;

the first and second receiver circuits each having equal impedances that are sufficient to pull the bus up to a voltage source to obtain a bus voltage and provide equal portions of the communication current to the bus from the voltage source, wherein the bus voltage decreases by a first predetermined voltage drop due to a pulse being transmitted by the transmitter circuit; and wherein a receiver circuit becomes active and accepts a pulse message upon detecting the communication current being drawn from the receiver circuits.

10. A system for transferring pulse messages between remote-controlled modules in an automotive vehicle, the system comprising:

a single wire bus coupled to each of the modules for transferring the pulse messages between each of the modules;

a first receiver circuit associated with at least one of the modules and coupled to the bus for providing a communication current to the bus, wherein the first receiver circuit has an impedance sufficient to pull the bus up to a voltage source to obtain a bus voltage and provide the communication current to the bus from the voltage source, wherein the bus voltage decreases by a first predetermined voltage drop due to a pulse message being transmitted;

a transmitter circuit associated with at least one of the modules and coupled to the bus for transmitting the pulse messages utilizing the communication current;

a collision detector circuit associated with at least one of the modules and coupled to the bus for detecting more than one pulse message being transmitted at the same time indicating a collision has occurred during communication, wherein the collision detector circuit includes an impedance sufficient to detect a second predetermined voltage drop of the bus voltage, the second predetermined voltage drop being larger than the first predetermined voltage drop; and wherein the first receiver circuit becomes active and accepts the pulse messages upon detecting the communication current being drawn from the receiver circuit.

* * * * *